United States Patent [19]

Barnes

[11] Patent Number: 4,733,015

[45] Date of Patent: Mar. 22, 1988

[54] TERMINATION ASSEMBLY

[75] Inventor: Bruce M. Barnes, Valencia, Pa.

[73] Assignee: Emerson Electric Co., St. Louis, Mo.

[21] Appl. No.: 859,340

[22] Filed: May 5, 1986

[51] Int. Cl.⁴ .............................................. H05K 5/06
[52] U.S. Cl. ................................ 174/65 R; 174/65 SS
[58] Field of Search ............... 174/65 G, 74 R, 65 SS, 174/65 R, 35 GC; 219/301

[56] References Cited

U.S. PATENT DOCUMENTS

| | | | |
|---|---|---|---|
| 2,272,178 | 2/1942 | McDowell et al. | 174/50 X |
| 2,541,236 | 2/1951 | Giuffrida | 174/50 |
| 2,623,981 | 12/1952 | Anderson et al. | 174/35 GC X |
| 3,873,759 | 3/1975 | Schindler et al. | 174/65 R |
| 4,030,741 | 6/1977 | Fidrych | 174/65 SS X |
| 4,149,028 | 4/1979 | Gressitt et al. | 174/65 R |
| 4,312,121 | 1/1982 | Tweed | 174/65 SS X |
| 4,538,053 | 8/1985 | Morrow et al. | 174/65 SS X |

FOREIGN PATENT DOCUMENTS

| | | | |
|---|---|---|---|
| 190063 | 6/1964 | Sweden | 174/65 SS |
| 724596 | 2/1955 | United Kingdom . | |

OTHER PUBLICATIONS

"Gaskets that Block EMI" (see Mounting Methods), 7 Aug. 1975, pp. 74–76, Machine Design, vol. 47, No. 19.

Primary Examiner—Arthur T. Grimley
Assistant Examiner—D. A. Tone
Attorney, Agent, or Firm—Polster, Polster and Lucchesi

[57] ABSTRACT

A plastic molded termination box assembly and a plastic molded end termination are both characterized by cavities defined by side walls tapering convergently toward one end and away from an open mouth, and separate parts defining a socket with walls directed convergently from an open mouth, the open mouths of the two parts being aligned, and an elastic grommet of a size and shape to be seated in the cavity in one part and socket in the other and to be compressed between the two parts when the parts are assembled together, the grommet having a conductor receiving opening in which a conductor is mounted. The conductor is mounted securely and the box and termination made weather tight by the compression of the grommet.

14 Claims, 15 Drawing Figures

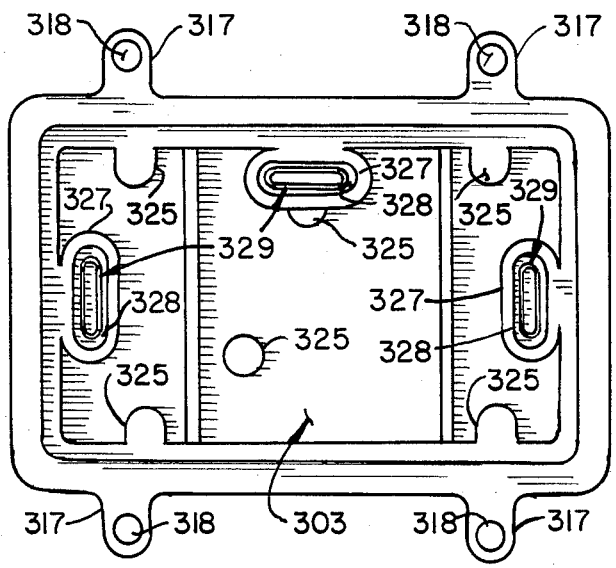
FIG. 5.
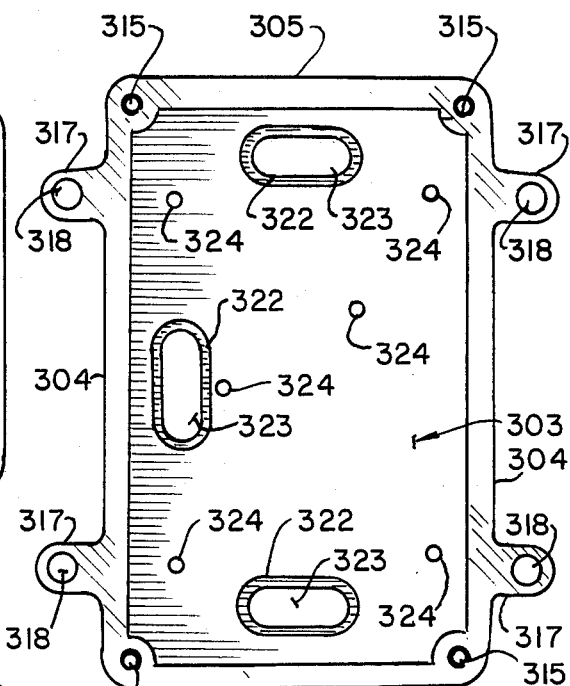
FIG. 6.
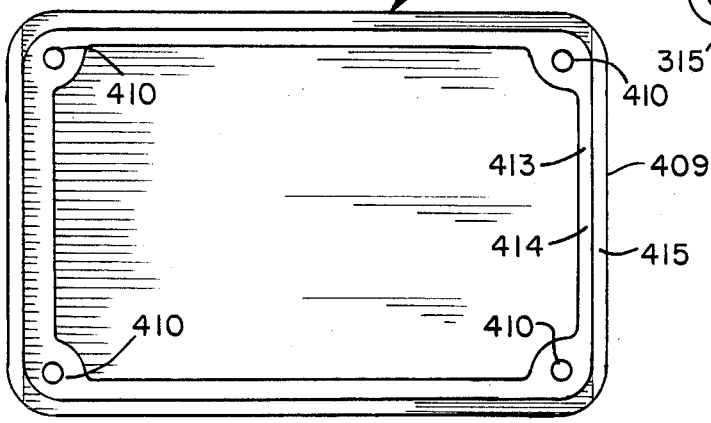
FIG. 7.
FIG. 8.
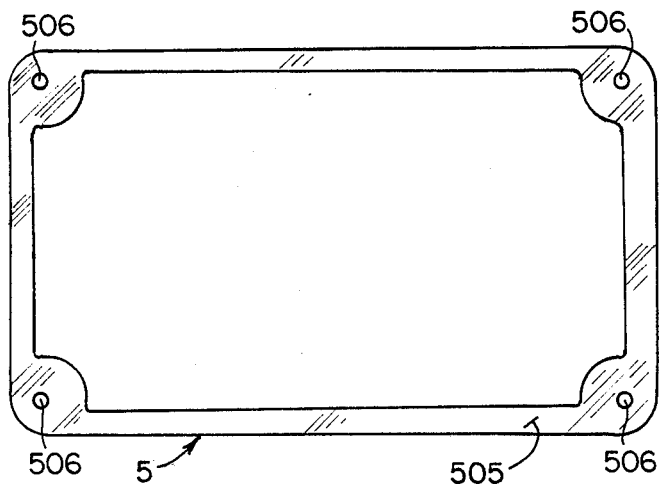
FIG. 9.

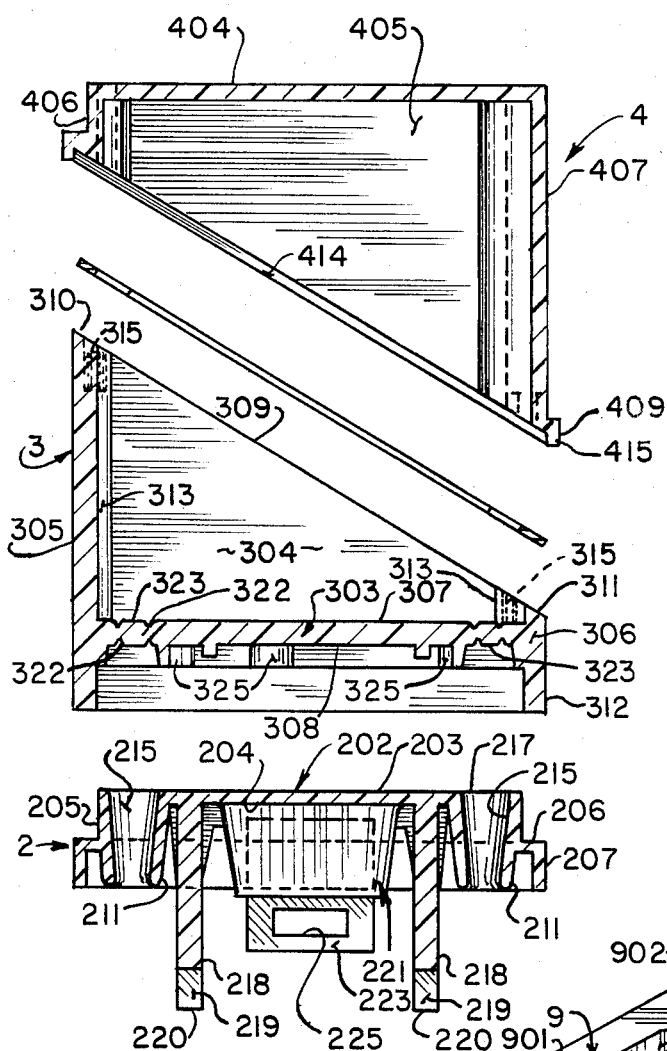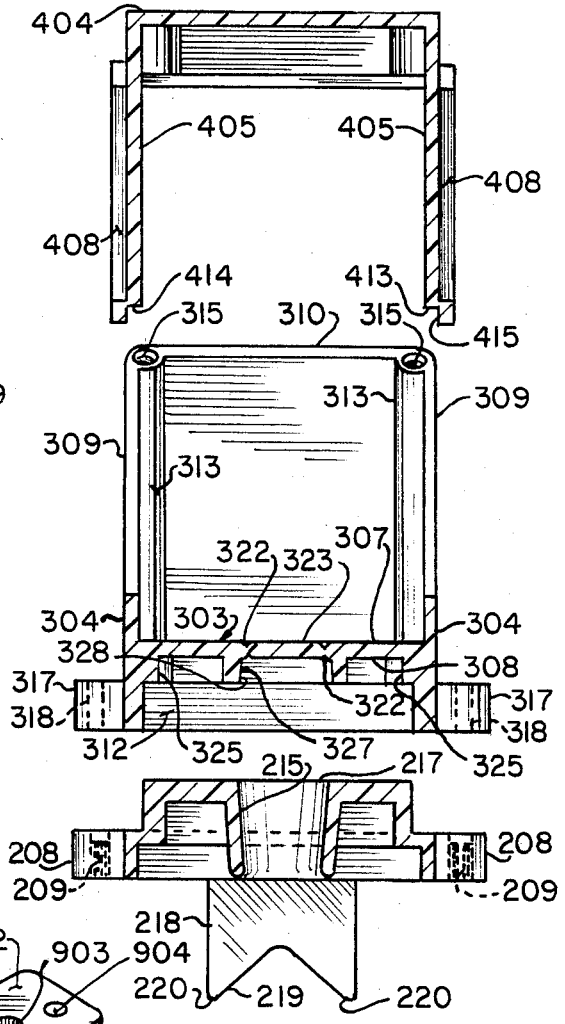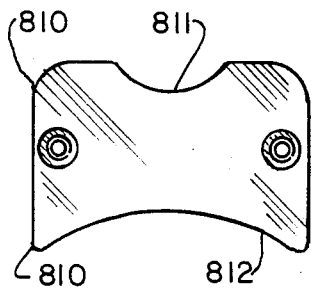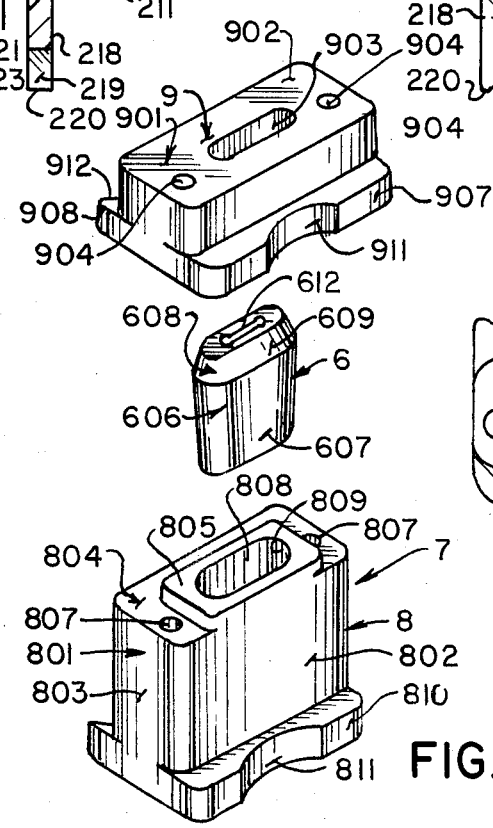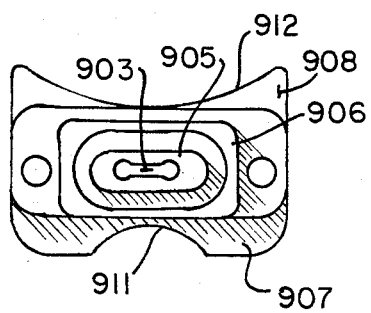
FIG.11.
FIG.12.
FIG.14.
FIG.13.
FIG.15.

TERMINATION ASSEMBLY

BACKGROUND OF THE INVENTION

This invention has to do particularly with heating cable, in which a pair of spaced conductors is joined by a web of PTC material, although it has other application as well. Heat tapes are used in industry to ensure against freezing of pipes, among other things. In that application, it is highly desirable to have a weather proof enclosure at one end, in which tapes running in different directions can be spliced and in which various controls can be housed or connected to the heating cables, and a termination at which free ends of heating cables can be mounted so as to ensure that the conductors are not shorted out at the ends.

One of the objects of this invention is to provide a termination box assembly and an end termination of molded plastic parts that are easily manufactured and, when assembled, provide a weather proof enclosure.

Other objects will become apparent to those skilled in the art in the light of the following description and accompanying drawings.

SUMMARY OF THE INVENTION

In accordance with this invention, generally stated, a termination box assembly is provided which includes a plastic molded unitary support fixture, a plastic molded unitary enclosure, a plastic molded unitary lid, and connecting means for connecting the support fixture to the enclosure and the lid to the enclosure. The support fixture has a side wall and a floor with top and bottom surfaces and at least one open-ended tube depending from the bottom surface of the web and opening through the top surface of the web. The enclosure has a bottom wall with at least one socket wall depending from it. The socket wall has an inner surface which defines a socket with an open mouth at a lower end, of a shape and position complementary to the opening of the tube in the top surface of the support fixture floor. The socket has a knock-out plate forming a closure for the socket at its upper end. The inside surface of the support fixture tube is convergent downwardly through at least a portion of its height and the inner surface of the socket is convergent upwardly. An elastically compressable grommet, shaped complementarily to the tube and socket walls, is seated in the tube and socket and compressed between them when the support fixture and enclosure are assembled. The grommet has a linear element-receiving opening in it, which, in the embodiments described is shaped to receive a heating cable. A heating cable in the opening is securely held when the grommet is compressed, and the grommet provides a weather-tight seal both for the heating cable and for the enclosure. In the preferred embodiment, the support fixture has, depending from the lower surface of the web, a pair of plate-like legs with inverted V's in their lower edges. The legs are spaced from one another and parallel to one another, and a strap-receiving bracket is positioned between them. The strap-receiving bracket has an elongated slot in it through which a strap can be passed to hold the support fixture on a pipe straddled by the V's of the legs if the pipe is small enough, or supporting the lower points of the legs if the pipe is larger than the spread of the Vs. If the assembly is mounted on a flat surface, the flat surface would support the lower points of the legs.

Preferably, the enclosure is rectangular in top plan, with two long side walls and two shorter end walls. One of the end walls is substantially higher than the other, and preferably, substantially thicker than any of the other side and end walls. The upper edges of the side walls slope downwardly from the heavier, taller end wall to the shorter, thinner end wall. The upper edges of the end walls are chamfered to lie in the same plane as the upper edges of the side walls.

The lid has side and end walls and a top wall, and a frame depending from the side walls and offset outboardly from the walls to define with the walls, a gasket-receiving ledge and an enclosure wall-embracing lip. In the preferred embodiment, a gasket with one adhesive surface is seated in and adhered to the gasket-receiving ledge of the lid. The flange of the lid has screw-receiving holes in it to receive screws which serve as the means for mounting the lid to the enclosure. The gasket preferably has holes to admit the screws, the gasket holes being of a size and position to capture the screws for holding the screws while the lid is being mounted on the enclosure.

A plastic molded end termination is provided that includes a cap, corresponding in function to a function of the support fixture of the termination box, and a pressure plate, corresponding in function to a function of the box enclosure as far as the seating and compression of a conductor-receiving grommet are concerned. The cap has a body with internal side wall and an internal bottom wall defining a well closed at one end and open at the other, the internal side wall tapering convergently toward the bottom wall. The cap has a stepped shelf surrounding the open end of the well at one end of the body and an integral flanged base at the other end of the body. The flanged base has an arc of one radius outboard of one side of the body and an arc of a different radius outboard of an opposite side of the body. The pressure plate has a closure body with a flange at one end, the flange having an inside surface defining a receptacle to receive the stepped boss of the cap and an outside wall having an arc of one radius corresponding to the arc of one radius of the flanged base of the cap and parallel thereto when the device is assembled and an arc of another radius corresponding to the arc of different radius of the flanged base of the cap and parallel thereto when the device is assembled. The closure body has an internal wall defining an open ended socket shaped and positioned at its inner end complementarily to the open end of the cap well, opening at its outer end in a configuration to receive a conductor to be terminated and tapering convergently toward that outer end. Connecting means, such as screws, connect the cap and the pressure plate. An elastically compressible grommet, which can be exactly the same as the grommet employed in the termination box, has a long lower body section tapering convergently complementarily to the cap well and seated in it, and a shorter top body section tapering convergently upwardly complementarily to the pressure plate socket and seated in it. The grommet is, like the grommet of the termination box, of a length and shape to be compressed between the cap and the pressure plate when the cap and pressure plate are assembled.

BRIEF DESCRIPTION OF THE DRAWINGS

In the drawing,

FIG. 5 is a bottom plan view of an enclosure part of the box shown in FIGS. 1 and 2, taken along the line 5—5 of FIG. 1;

FIG. 6 is a top plan view of the enclosure part of the box, taken along the line 6—6 of FIG. 1;

FIG. 7 is a bottom plan view of a lid part of the box shown in FIGS. 1 and 2, taken along the line 7—7 of FIG. 1;

FIG. 8 is a top plan view of the lid part, taken along the line 8—8 of FIG. 1;

FIG. 9 is a top plan view of a gasket to be interposed between the lid part and the enclosure;

FIG. 11 is an exploded sectional view along a line lengthwise of the box;

FIG. 12 is an exploded sectional view taken along a line widthwise of the box;

FIG. 13 is an exploded view in perspective of one illustrative embodiment of end termination of this invention, FIG. 14 is a bottom plan view of the end termination shown in FIG. 13; and FIG. 15 is a bottom plan view of a pressure plate part of the end termination shown in FIG. 13.

DESCRIPTION OF THE PREFERRED EMBODIMENT

Figure 1:
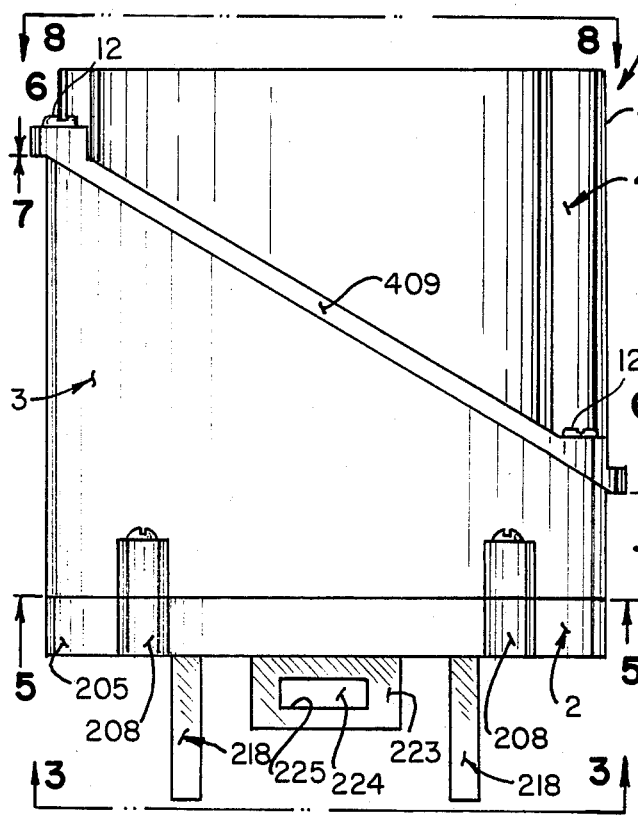
FIG. 1 is a view in side elevation of one illustrative embodiment of termination box of this invention.

Referring now to the figures, and particularly to FIGS. 1 through 12 for one illustrative embodiment of termination box assembly, reference numeral 1 indicates a completed assembly. In this embodiment, the assembly is made up of five principal parts, a support fixture 2, an enclosure 3, a lid 4, a gasket 5, between the lid and the enclosure, and at least one grommet 6, as shown particularly in FIG. 10.

Figure 3:
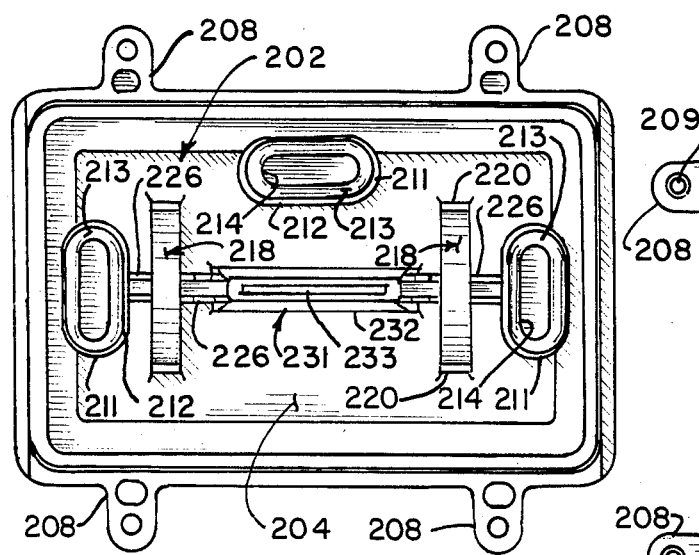
FIG. 3 is a bottom plan view along the line 3—3 of FIG. 1.
Figure 4:
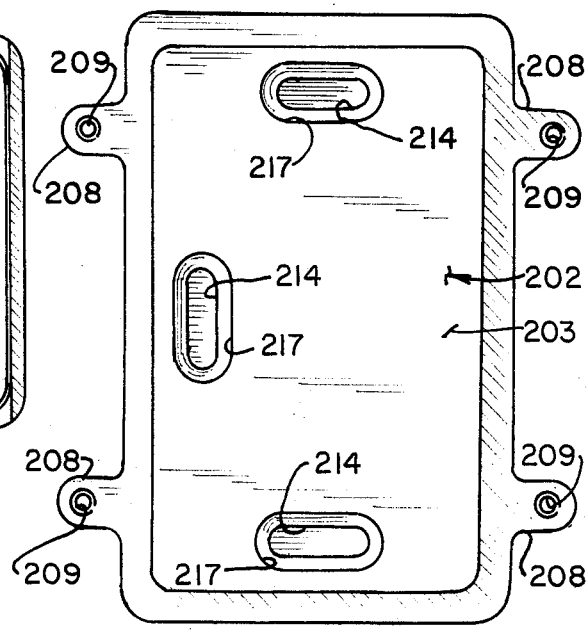
FIG. 4 is a top plan view of a support fixture separated from the assembly shown in FIGS. 1 and 2, the view being taken along the line 4—4 of FIG. 2.

The support fixture 2 has an elongated substantially rectangular floor 202 with a top surface 203 and a bottom surface 204 as shown particularly in FIG. 11. A skirt 205 depends from the edges of the floor with an outboardly extending step or ledge 206 and a lower skirt portion 207. Four screw bosses 208 project laterally from the lower skirt 207 along long sides of the lower skirt. Internally threaded screw inserts 209 are molded into the screw bosses 208. Support fixture grommet receptacles take the form of oval tubes 211, as shown in FIGS. 3 and 11. In this embodiment, there are three tubes 211, two with long axes parallel to the shorter sides of the rectangular floor 202, and one, along and in the center lengthwise of a long side of the floor 202. Each of the tubes has an outer surface 212, partly common with an inside surface of the upper part of the skirt 205, and an inner wall surface 214, the two surfaces meeting at a smooth rounded lower edge 213. The inner wall surface 214 has a tapered section 215, tapering convergently downwardly, and a short straight section at its lower end to facilitate the molding of the rounded lower edge 213. The inner wall surface extends through the floor 202 and opens in an upper mouth 217 through the upper surface 203.

Figure 2:
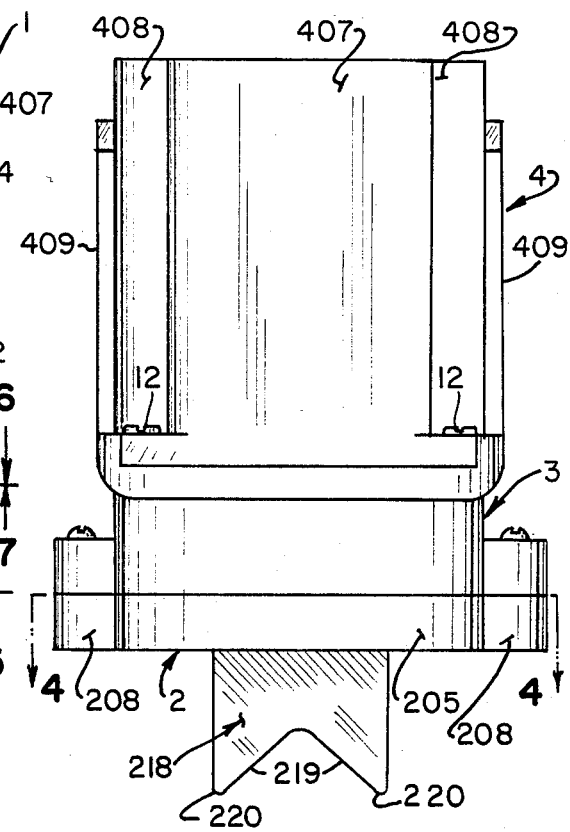
FIG. 2 is a view in end elevation viewed from right to left of FIG. 1.

In this embodiment, two flat, plate-like legs 218 depend from the lower surface 204 of the floor 202. The legs 218 are wide in the widthwise dimension of the floor 202. The legs are spaced from one another, parallel to one another and parallel to the shorter sides of the floor 202, and perpendicular to the plane of the bottom surface 204. The lower ends of the legs are formed in an inverted V 219, which leaves spaced feet 220, as shown in FIGS. 2 and 12.

A strap bracket assembly 231 lies between the legs 218 along the long axis of the floor 202, as shown particularly in FIG. 3. The bracket assembly 231 includes a bracket boss 232, and a metal strap plate 233, molded in place in the boss 232. The metal strap plate 233 has an opening 234 in it, extending lengthwise of the plate and defined in part by an edge 235 lying parallel to the bottom surface 204 of the floor 202, and perpendicular to the flat sidewalls of the legs 218. Gussets 226 reinforce the legs and bracket boss.

The enclosure 3 has a bottom wall 303, side walls 304, a tall end wall 305 and a short end wall 306. The side walls 304 and end wall 306 are of substantially the same thickness, but the end wall 305 is thicker.

The bottom wall 303 has a top surface 307 and a lower surface 308. An upper edge 309 of the side walls slopes from an upper edge 310 of end wall 305 to an upper edge 311 of end wall 306. The side wall upper edge is perpendicular to the inner and outer surfaces of the side walls 304, but the end wall upper edges 310 and 311 are chamfered to lie in the same plane as the edges 309. The bottom wall 303 lies within the compass of and above the lower edge of the walls 304, 305 and 306, and a uniformly thicker section of those walls below the bottom wall forms a skirt 312, as shown particularly in FIGS. 11 and 12. The skirt 312 embraces the floor 202 and seats at its lower edge on the step 206 when the box is assembled. Piers 313, in the inner four corners of the enclosure, serve the double purpose of reinforcing the walls and providing, at their upper ends, seats for internally threaded screw inserts 315. Screw bosses 317 project laterally from the outer surface of the skirt along the side walls 304, in a position complementary to the screw bosses 208 of the support fixture tube. The screw bosses 317 have holes 318 through them, aligned with the screw inserts 209 when the box is assembled.

"Scorelines" in the bottom wall top surface and lower surface form a thin web 322 defining each of three knockouts 323 positioned directly above the mouths 217 of the grommet receptacles in the support fixture when the support fixture and enclosure are assembled.

Blind screw holes 324 open through the top surface of the bottom wall 303, and bottom in bosses 325 depending from the lower surface 308 of the bottom wall. Also depending from the lower surface 308 are oval walls 327 surrounding the undersides of the knockouts 323. The walls 327 have an inside surface 328 tapering convergently upwardly toward the knockouts, defining sockets 329, extending above but around the mouths 217 of the grommet receptacles in the support fixture 2.

The lid 4 has a top wall 404, side walls 405, a short end wall 406 and a tall end wall 407. The lower edges of the side walls 405 slope from the short end wall 406 to the tall end wall 407 complementarily to the slope of the upper edge 309 of the side walls 304 of the enclosure 3, in such a way that the side and end walls of the enclosure and the lid are aligned and lie in the same plane when the box is assembled, as shown in FIGS. 1 and 2.

Flutes 408 between the side and end walls extend from the top of the top wall 404 to the top surface of a frame 409. The frame 409, which projects perpendicularly to the walls of the lid from the lower edges of the walls has screw holes 410 at four vertically thickened corners, aligned with the screw inserts 315 at the upper ends of the piers 313. The frame 409 has an internal step bounded by a rim 415 which, with an internal ledge 413, forms a gasket-receiving channel 414. The ledge 413 is chamfered at the two ends to lie in the same plane as the lower edges of the side walls between the short end wall 406 and the tall end wall 407, but the lower edges of the rims along the end walls are perpendicular to the planes of the end walls, as shown particularly in FIG. 11.

The rim 415 is configured and proportioned to embrace closely the outer surfaces of the upper edges of the walls 304, 305 and 306 of the enclosure.

Figure 10:
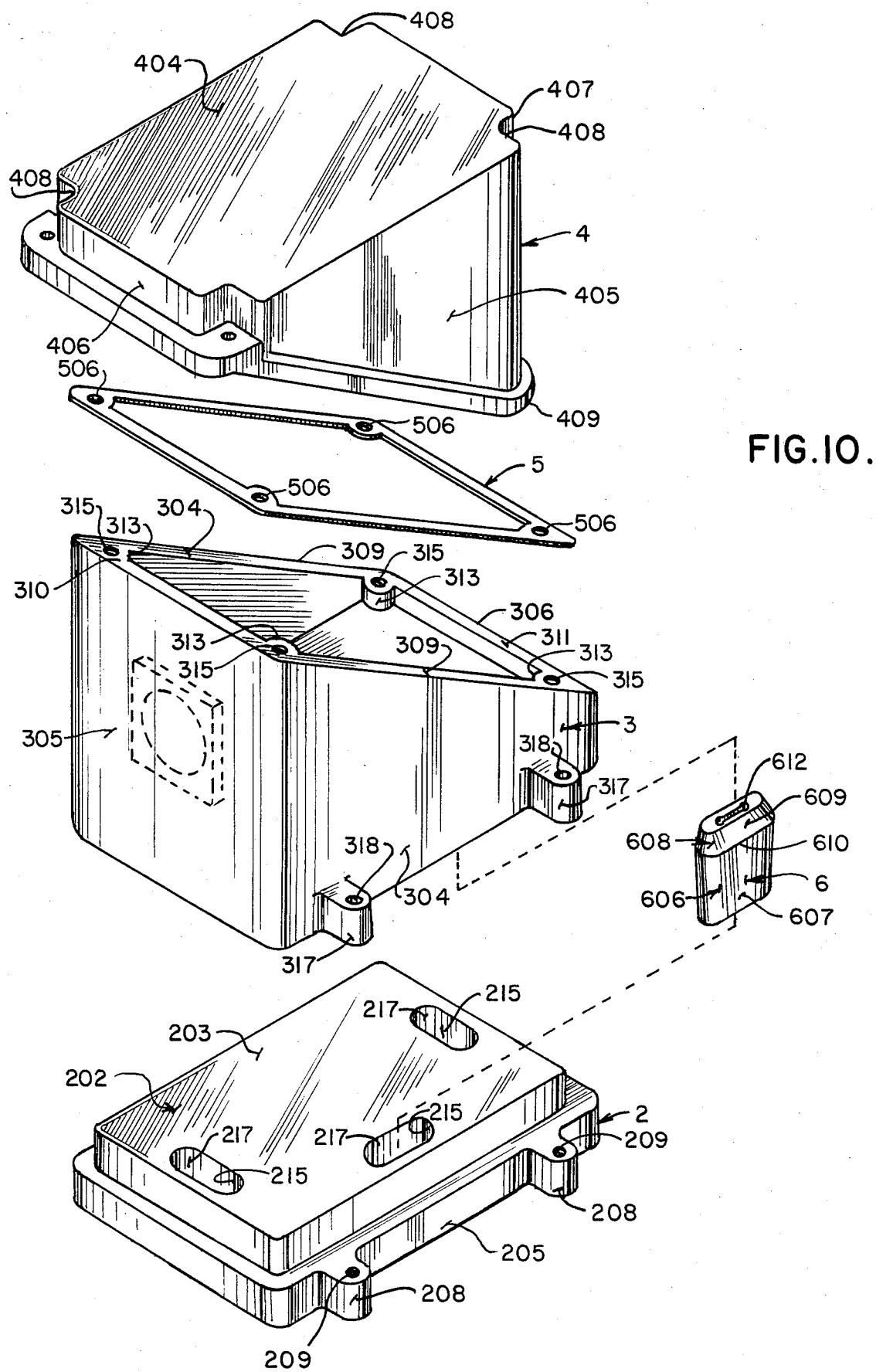
FIG. 10 is an exploded view in perspective of the box shown in FIGS. 1 and 2.

The gasket 5 is flat, made of a resilient, weather proof material such as rubber or neoprene, for example, and of a size and shape to fit in the channel 414, and to cover the ends of the piers 313 and pierlike members constituting continuations of the inside surfaces of the flutes 408 between the upper surface of the frame and the ledge 413, as shown in FIGS. 9 and 10. An upper face 505 of the gasket is preferably covered with adhesive to cause it to adhere to the ledge 413. The gasket has screw holes 506, concentric with and aligned with the holes 410 and the inserts 315, but slightly smaller in diameter, so as to retain screws 12 when they are put into screw holes 410 and given a few turns into and through the screw holes 506.

The grommet 6, shown in FIG. 10 as applied to the terminal box 1, and FIG. 13 as applied to the end termination, is made of elastically compressible material. It is oval in plan and has a long tapered end 606, with exterior surface 607 tapering convergently downward as viewed in the figures, complementarily to the tapered inside surfaces 215 of the grommet receptacles of the support fixture 2, and a short end 608, with an exterior surface 609 that tapers convergently upwardly complementarily to the internally tapered surface 328 of the sockets 329 of the enclosure 3. The dimensions and configuration of the exterior surfaces 607 and 609 are, however, slightly larger as they approach the arris or meeting line 610 between them, than the receptacles and sockets into which they extend, so that when the enclosure is pulled down to meet the support fixture, they are compressed between the sockets and the receptacles and deformed elastically inwardly.

A passage 612 extends uniformly through the grommet 6, opening through the top and bottom surfaces of the grommet. In this embodiment, the passage 612 is shaped complementarily to the shape of a standard heating cable.

In use, assuming, for purposes of illustration, that the enclosure is to serve as a junction box for three different tapes wound about pipes extending from a T, free ends of the heating cables are led through the tubes 211 of the support fixture 2. The support fixture can be strapped to a pipe, either before or after the heating cables are inserted, by running a strap through the opening 224 in the strap plate 223, placing the support fixture with the V's of the legs astraddle the pipe, and tightening the strap around the pipe. The free end of each of the heating cables is then passed through a passage 612 in the grommet 6, from the bottom through the top as viewed in FIG. 10, and pulled out far enough to permit the conductors to be stripped and connected as desired. The knock-outs 323 of the enclosure 3 are then punched out, the ends of the conductors led through the appropriate resulting openings, and the grommets, seated in the grommet receptacles of the support fixture, are compressed between the sockets 329 and the walls 215 of the receptacles, by inserting screws 11 through the holes 318 and screwing them into the inserts 315.

The conductors of the different heating cables can either be electrically connected directly to one another or connected to a switch or fuse or other element mounted in the enclosure by means of screws taking into the screw holes 324, or they can be connected to electric conductors from a source of power, not here shown, led in through a weather-tight fitting mounted in a hole drilled in the thick end wall 305 of the enclosure. Such a hole is indicated in phantom lines in FIG. 10.

As has been indicated, the gasket 5 can be adhesively mounted within the channel 414 of the lid 4, and screws mounted in the holes 410 by means of the gasket. The lid, then, need only be placed in position on top of the enclosure 3, and the screws driven into the inserts 315.

It can be seen that the integrity of the enclosure is of paramount importance. By providing the knock-outs in the enclosure bottom wall, if only one or two heating cables need be accommodated, the remaining knock-out or knock-outs can be left in place, forming an absolute barrier to the entrance of moisture.

Referring now to FIGS. 13, 14 and 15 for one embodiment of end termination of this invention, reference numeral 7 indicates the end termination assembly, made up of a cap 8, a pressure plate 9, an elastically compressible grommet 6 and screws, not here shown but comparable to the screws 11, for joining the cap and pressure plate.

The cap consists of a body 801 generally rectangular in plan and elevation, with exterior surfaces in the form of sides 802 and ends 803, the ends being mirror images and the sides, mirror images, of one another. A top surface 804 has a raised shelf, regularly rectangular in plan and equidistant from the end walls 803, but positioned asymmetrically with respect to the side walls, one edge of the shelf being flush with one of the side walls 802. The shelf 805 is surrounded on three sides by a ledge 806, through the upper surface of which, on either end of the shelf, are cavities in which screw inserts 807 are molded. A well 808 with a side wall 809 tapering convergently downwardly complementarily to the side wall 607 of the grommet 6 opens through the upper surface of the shelf 805. The well 808 is closed at its lower end. The body 801 has a flanged base 810 extending from and perpendicular to the side walls 802. The flange along one of the side walls is formed with an arc 811 of one radius, centered in the lengthwise direction of the flange. The flange on the opposite side is formed with an arc 812 of relatively large radius, centered with respect to the long direction of the flange, as shown particularly in FIGS. 13 and 14.

The pressure plate 9 has a body 901, with a top wall 902 through which a heating cable-receiving passage 903 extends. The heating cable-receiving passage is elongated in the long dimension of the body, and is flanked at either end by screw holes passing through the body and aligned with the screw inserts 807 when the termination is assembled. The heating cable-receiving passage 903 communicates with a socket 905, shaped complementarily to the tapered end 608 of the grommet 6. The area around the socket 905 is recessed to provide a frame 906, to receive the shelf 805 when the end termination is assembled. A flat area beyond the frame 906 on either side seats on the corresponding area of the top 804 of the body 801 of the cap 8. A flange 907 along one side wall of the body 901 has an arc 911 corresponding to the arc 811 and parallel and aligned therewith when the termination is assembled; a flange 908 on the side opposite the flange 907 has an arc corresponding to the arc 812, and parallel and aligned therewith when the end termination is assembled.

The frame 906 and the socket 905 are positioned to be aligned with the shelf 805 and the mouth of the well 808, and are thus asymmetrical with respect to the widthwise dimension of the body. In this way the cap and pressure plate can be assembled in only one orientation, so that the arcs 811 and 911 and 812 and 912 are always properly aligned.

In use, the pressure plate 9 is slipped onto the heating cable to be terminated, with the socket 905 facing the free end of the tape. The end of the tape is inserted in the passage 612 of the grommet 6 from the upper end of the grommet as viewed in FIG. 13 to a point close to the bottom. The lower end of the grommet and its inserted tape are put into the well 808 in the proper orientation with respect to the pressure plate 9, and screws, extending through the screw holes 904 are threaded into the screw inserts 807 and turned down tightly, compressing the grommet 6 and causing it to grip the heating cable and to seal the socket and well against the entrance of moisture. The assembled end termination can then be strapped to a pipe or other surface. The radii of the arcs of the flanges are chosen to accommodate pipes of the most common diameters. If the diameter of the pipe is too great, or the surface is flat, the ends of the arc form feet to support the termination. In any event, the termination has a low profile.

The support fixture of the termination box and the cap of the end termination can be viewed as grommet-receiving receptacle members, and the enclosure and pressure plate, as closure members, in the broad sense, although they have additional functions.

Numerous variations in the construction of the device of this invention, within the scope of the appended claims, will occur to those skilled in the art in the light of the foregoing disclosure. Merely by way of illustration and not of limitation, the skirt 205 can be made longer and provided with opposing V's in one direction and strap-accommodating notches in the other. The strap bracket 223 can be formed of plastic, integrally with the bottom surface of the floor 202. In the preferred embodiments described, except for the strap plate 223 and the screw inserts 209 and 315, which are molded into the support fixture and enclosure, the support fixture, enclosure and lid are all made as unitary, one piece molded parts, as are the cap and pressure plate of the end termination assembly. Although it is disadvantageous to do so, these parts can be made differently. The hole which has been suggested to be drilled in the thick wall 305 of the enclosure can be formed in the molding, or one or more knock-outs can be formed as knock-outs 323 are, although it requires a more complicated mold. Other holes can be made to accommodate externally extending thermostatic controls or switches, for example. Other walls can be made thicker to support attachments and admit of drilling passages without danger of cracking. Although it is desireable to have the gasket self-adhering and mounted in the lid channel, a non-adhering gasket can be used. The sockets 329 and 905 in the embodiment described serve some compressing function about the upper section 608 of the grommet 6, but they serve also a locating function. To that extent, the configuration of the sockets can be made different. The grommets can be designed for linear elements different from heating cables, such, for example, as power cords, metallic tubing or thermocouple wiring, although, as has been indicated, the device of this invention has particular utility as applied to heating cable. The grommets can be formed of other compressible materials, such as fluorocarbon elastomers or silicone rubber. Different fastening means, such as self-tapping screws, or clamps, can be used in which cases no screw inserts need be molded in. These variations are merely illustrative.

I claim:

1. A termination assembly comprising a plastic molded support fixture, a plastic molded enclosure and a plastic molded lid, and connecting means for connecting said support fixture, enclosure and lid, said support fixture having a floor having top and bottom surfaces, and at least one open-ended tube depending from said floor bottom surface and opening through said top surface of said floor; said enclosure having a bottom wall, at least one socket wall depending from said bottom wall, said socket wall having an inner surface defining a socket with an open mouth at a lower end thereof of a shape and position complementary to the opening of said tube in said top surface of said support fixture floor, and a knock-out plate forming a closure for said enclosure socket at the upper end thereof, the wall defining the inside surface of said support fixture tube being convergent downwardly through at least a portion of its height, the inner surface of the socket defined by the enclosure socket wall being convergent upwardly, and an elastically compressible grommet, shaped complementarily to said tube and socket walls being seated in said tube and socket and compressed therebetween when said support fixture and enclosure are assembled, said grommet having a linear element-receiving opening in it.

2. The assembly of claim 1 wherein the knock-out plate is integral with the said bottom wall and is defined by channels of weakness forming thin webs.

3. The assembly of claim 1 wherein the enclosure has four side walls, one wall being of substantially greater thickness than the other three.

4. The assembly of claim 1 wherein the lid has walls complementary to the walls of the enclosure and an integral depending frame offset outboardly from said walls to define within said frame, with said walls, a gasket-receiving ledge, and an enclosure wall-embracing lip.

5. The assembly of claim 4 including a gasket, adhered on one surface to said lid ledge within the compass of said lip.

6. The assembly of claim 5 wherein said frame has screw receiving holes and said enclosure has complementary screw receiving holes and means for threadingly receiving screws and said gasket has screw admitting holes of a size and position to capture screws for holding said screws while the lid is being mounted on said enclosure.

7. The assembly of claim 1 wherein the enclosure has four walls defining a rectangular area in plan, with two long side walls and two shorter end walls, one of said end walls being higher with respect to said bottom wall than the other of said end walls, and the upper edges of said side walls, in side elevation, being sloped from said higher end wall to said lower end wall, the upper edges of said end walls being chamfered complementarily to lie in a single plane with said upper edges of said side walls.

8. The assembly of claim 1 wherein a grommet opening to receive a conductor extends through the full length of the grommet.

9. A termination assembly comprising a plastic molded support fixture, a plastic molded enclosure and a plastic molded lid, and connecting means for connecting said support fixture, enclosure and lid, said support fixture having a floor having top and bottom surfaces, and at least one open-ended tube depending from said floor bottom surface and opening through said top surface of said floor; said enclosure having a bottom wall, at least one socket wall depending from said bottom wall, said socket wall having an inner surface defining a socket with an open mouth at a lower end thereof of a shape and position complementary to the opening of said tube in said top surface of said support fixture floor, and a knock-out plate forming a closure for said enclosure socket at the upper end thereof, said enclosure having an enclosure skirt extending below a lower surface of said bottom wall and below said socket-defining socket wall, said upper surface of said support fixture floor extending within and being completely surrounded by said enclosure skirt when said enclosure and support fixture are assembled, said support fixture having a support fixture skirt depending from, extending downwardly from and then offset outboardly with respect to said floor to define an enclosure skirt lip-receiving step on its upper surfaces and encompassing said tube with its under surface.

10. The assembly of claim 9 including a pair of legs integral with said support fixture floor bottom surface and depending therefrom and extending beyond said tube and skirt, said legs being spaced from one another along said bottom surface.

11. The assembly of claim 10 wherein the skirt is elongatedly rectangular in plan, with side and end walls, the legs are spaced in the lengthwise direction of the side walls, and the lower end of each of said spaced legs has an inverted V-shaped.

12. The assembly of claim 11 including a strap-receiving bracket positioned symmetrically between said legs in the long dimension of the skirt, said bracket having an elongated strap-receiving opening extending in the direction substantially parallel to the bottom surface of said floor.

13. The assembly of claim 12 wherein the bracket comprises a metal plate molded into a boss in said support fixture floor lower surface.

14. A termination assembly comprising a plastic molded cap and a plastic molded pressure plate, said cap having a body with an internal side wall and an internal bottom wall defining a well closed at one end and open at the other, said internal side wall tapering convergently toward said bottom wall, a stepped shelf surrounding said open end of said well at one end of said body and an external flanged base at the other end of said body, said flanged base having an arc of one radius outboard of one side of said body and an arc of a different radius outboard of an opposite side; said pressure plate having a closure body with a flange at one end, said flange having an inside surface defining a receptacle to receive the stepped shelf of the cap and an outside wall having an arc of one radius corresponding to the arc of one radius of said flanged base of said cap and parallel thereto and aligned therewith when the device is assembled and an arc of another radius corresponding to the arc of different radius of said flanged base of said cap and parallel thereto and aligned therewith when the device is assembled, said closure body having an internal wall defining an open-ended socket shaped and positioned at its inner end complementarily to the open end of said cap well and opening at its outer end in a configuration to receive a conductor to be terminated and tapering convergently toward said outer end, and an elastically compressible grommet mounted within said cap and pressure plate, said grommet having a long lower body section tapering convergently complementarily to said cap well and seated therein, and a shorter top body section tapering convergently upwardly complementarily to said pressure plate socket and seated therein, said grommet being of a length and shape to be compressed between said cap and said pressure plate when said cap and pressure plate are assembled.

* * * * *